(12) United States Patent
Saxena et al.

(10) Patent No.: US 11,741,172 B2
(45) Date of Patent: Aug. 29, 2023

(54) METHOD AND SYSTEM FOR MEASURING, MONITORING AND ENHANCING USER EXPERIENCE FOR PERSONAS ACROSS THEIR END TO END JOURNEY

(71) Applicant: Genpact Luxembourg S.à r.l. II, Luxembourg (LU)

(72) Inventors: Vivek Saxena, Gurgaon (IN); Kathryn Stein, New York, NY (US); Vikram Jha, Sealdah (IN); Lavi Sharma, Noida (IN); Anand Jhaveri, Longfield (GB); Sachin Gupta, Hyderabad (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 0 days.

(21) Appl. No.: 17/468,454

(22) Filed: Sep. 7, 2021

(65) Prior Publication Data

US 2023/0072453 A1  Mar. 9, 2023

(51) Int. Cl.
  *G06F 16/951*   (2019.01)
  *G06F 16/9535*  (2019.01)
  *G06N 20/00*    (2019.01)
  *G06F 16/9537*  (2019.01)
  *G06F 16/9538*  (2019.01)

(52) U.S. Cl.
  CPC ........ *G06F 16/951* (2019.01); *G06F 16/9535* (2019.01); *G06F 16/9537* (2019.01); *G06F 16/9538* (2019.01); *G06N 20/00* (2019.01)

(58) Field of Classification Search
  None
  See application file for complete search history.

(56) References Cited

U.S. PATENT DOCUMENTS

2019/0369856 A1* 12/2019 Torbey .................... G06F 3/048
2021/0278953 A1*  9/2021 Jang ...................... G06T 11/206

* cited by examiner

*Primary Examiner* — Amresh Singh
(74) *Attorney, Agent, or Firm* — Goodwin Procter LLP

(57) ABSTRACT

A method for assessing user experience includes determining one or more experience journey maps, identifying personas included in the one or more experience journey maps, and collecting user experience related data from the personas included in the one or more experience journey maps. The method further includes identifying user experience gaps based on an analysis performed on the experience related data collected, and providing a graphical representation that highlights the user experience gaps. The method also includes generating recommendations for execution to mitigate the user experience gaps highlighted in the graphical representation, monitoring and tracking a progress of the executed recommendations, and performing automated monitoring and offset metric tracking of targeted experience-related input metrics used to gauge a performance of the executed recommendations.

20 Claims, 13 Drawing Sheets

| Create Assessment | ① Basic Details | ② Participant | ③ Weightage | ④ Assessment Roll-out | | | | | |
|---|---|---|---|---|---|---|---|---|---|

↥ Upload List

| ☐ Name | Email | Designation | Business Unit | Division | Location | Persona | Profile | Journey Map |
|---|---|---|---|---|---|---|---|---|
| ☐ John Doe | johndoe@genpact.com | Collector | PQR Ltd. | Corporate | NY | Collector ▾ | Stakeholder ▾ | AP ▸ |
| ☐ List Item name 2 | HTTP | Manager | Third Rule | AP | Noida | Assistant ▾ | Stakeholder ▾ | AR ▸ |
| ☐ List Item name 3 | HTTP | Collector | Third Rule | AR Flow | Bangalore | Collector ▾ | Stakeholder ▾ | AR ▸ |
| ☐ List Item name 4 | HTTP | Manager | Third Rule | GE Aviation Group | Noida | Assistant ▾ | Stakeholder ▾ | AR ▸ |
| ☐ List Item name 5 | HTTP | Manager | Third Rule | GE Aviation Group | Bangalore | Assistant ▾ | Stakeholder ▾ | AR ▸ |

⊞ Add More

[ Cancel ]   [ Back ]   [ Next ]

FIG. 9

| ML Model | Positive | Negative | Neutral | Total |
|---|---|---|---|---|
| Text | 5 | 3 | 2 | 10 |
| Audio | 3 | 10 | 1 | 14 |
| Digital footprint | 1 | 3 | 3 | 7 |
| Facial Expression | 3 | 3 | 3 | 9 |
| Total Ingestions | 12 | 19 | 9 | 40 |
| Principal component factor | 2 | -2 | 0 | |
| Ingestion Quotient | 24 | -38 | 0 | -14 |

FIG. 11

METHOD AND SYSTEM FOR MEASURING, MONITORING AND ENHANCING USER EXPERIENCE FOR PERSONAS ACROSS THEIR END TO END JOURNEY

TECHNICAL FIELD

This disclosure relates to a method and system measuring, monitoring and enhancing user experience (i.e. employee experience and customer experience) for personas across their end to end journey within business units and/or organizations.

BACKGROUND

User experience (UX) is a new field that is gaining prominence among companies. Research shows that companies leading in UX outperform their competitors by as much as 80%. At the same time, 73% of companies with above-average UX, perform better financially than their competitors. Further, companies that excel at UX, have 1.5 times more engaged employees than less experience-focused companies.

Even though advancements in psychological research can often provide a correlation between UX and business outcomes, there is no systematic method or tool in the market that measures end-to-end persona based experiences (comprising of EX-employee experience and CX-Customer experience) through the entire duration of one or more processes. In fact, the only measure of experience has been achieved via the net promoter score (NPS), which primarily focuses on an overall satisfaction and not on UX. More specifically, NPS lacks the ability to identify and/or analyze the factors impacting UX, and subsequently convert these factors into an actionable experience enhancement program for an organization.

On the front of customer experience (CX), information technology (IT) monitoring tools are often used as "digital experience" monitoring applications to collect and report CX-related information and data. However, these IT monitoring tools only measure CX data related to IT systems and capture only part of the experience.

Therefore, there is a need for a systematic method that evaluates, analyzes, summarizes, provides recommendations, and continuously monitors end-to-end UX to comprehensively quantify the human experience journey across one or more processes for all the involved stakeholders.

SUMMARY

According to some embodiments, the method and system described herein measure, analyze, summarize, provide recommendations, and continuously monitor UX in terms of customer (or stakeholder) experience (CX) and employee experience (EX) across one or more end-to-end processes within business units and/or organizations. The aforementioned processes, which are referred to herein as "experience journeys" or "journeys", include one or more experience touchpoints (ET) at which the participant (e.g., an employee and/or customer or stakeholder) has the opportunity to interact with the process and develop a pleasant or an unpleasant experience. In some embodiments, the method and system described herein can capture both tangible and intangible experiences from customer and employee participants by collecting and analyzing their respective feedback throughout each journey at the ET locations. The collected feedback may include written feedback, audio feedback, video feedback, automatically collected digital data, or any combinations thereof. Subsequently, the feedback is aggregated into a digestible format that allows quick detection of UX gaps between customers (or stakeholder) and employees across each journey. In some embodiments, the method and system described herein provide customized recommendations tailored to the needs of the organization (or of the business unit) that can improve poorly UX performing ETs in each journey, and bridge the gap between EX and CX. Finally, the method and system described herein continuously monitor the UX within each journey to track the progress of each ET in the journey during or after the execution of the proposed recommendations.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 9 is an exemplary participant list prepared for several participants across different experience journey maps, according to some embodiments.

FIG. 11 shows feedback collected from one participant for a given sub-process within the experience journey map, according to some embodiments.

DETAILED DESCRIPTION

Figure 1:
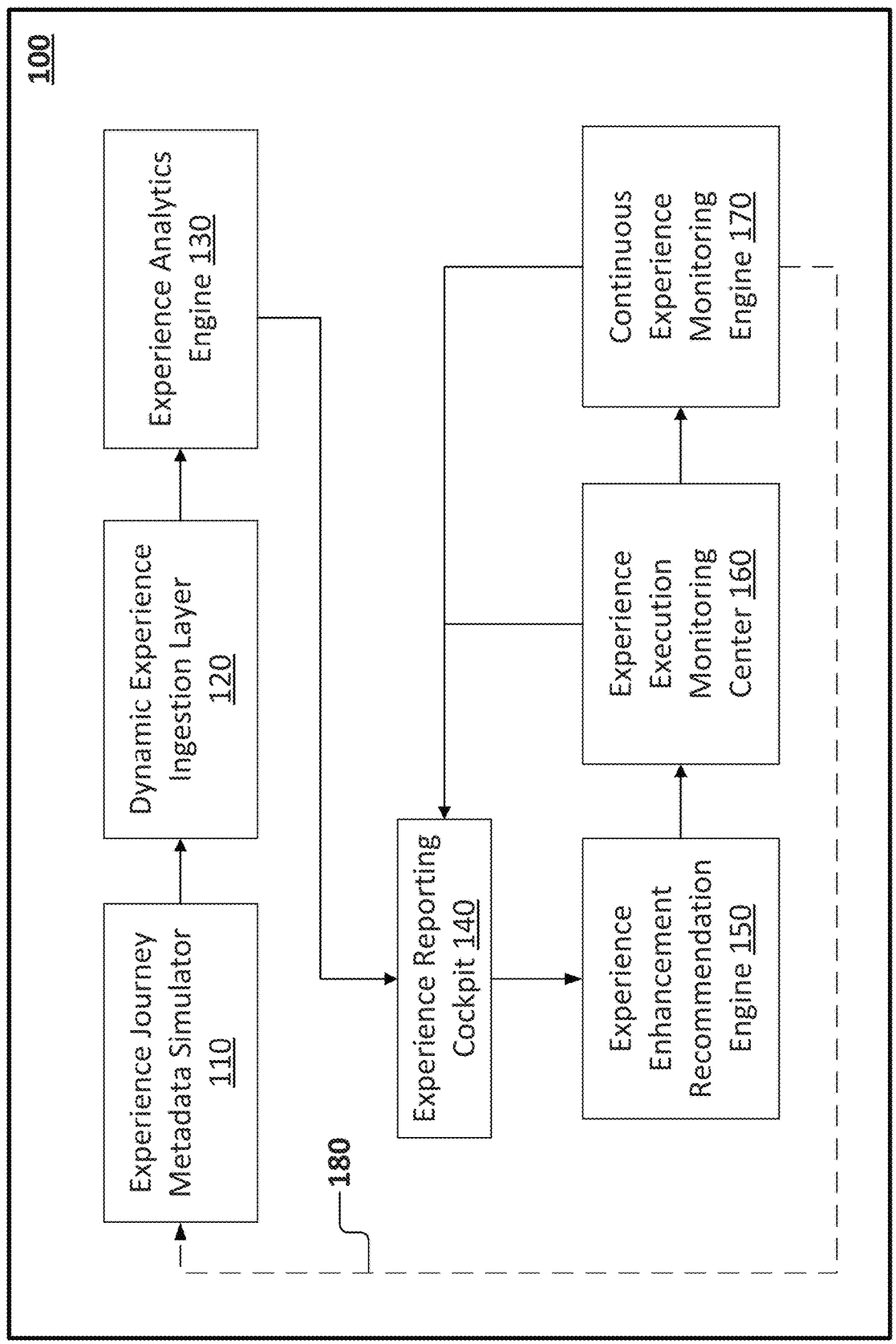
FIG. 1 shows a high-level architecture of an experience analyzer tool, according to some embodiments.

FIG. 1 shows a high-level architecture of an experience analyzer tool 100 and its components or modules. According to some embodiments, experience analyzer tool 100 is configured to assess UX in terms of EX and CX within one or more experience journeys. As shown in FIG. 1, experience analyzer tool 100 includes the following modules: an experience journey metadata simulator 110, a dynamic experience ingestion layer 120, an experience analytics engine 130, an experience reporting cockpit 140, an experience enhancement recommendation engine 150, an experience execution monitoring center 160, and a continuous experience monitoring engine 170. In some embodiments, the aforementioned modules include additional elements not shown in FIG. 1 for simplicity. One-way arrows indicate the interactions amongst the modules and the direction of information flowing between the components.

The term "tool" as used herein may refer to a collection of software and hardware components that work together so that the tool can perform its intended function. By way of example and not limitation, hardware components may include one or more servers, one or more personal computers, or one or more smart electronic devices connected to internal or external networks and configured to run software applications to perform a variety of functions, including logical functions. According to some embodiments, the aforementioned hardware components are communicatively coupled to one or more databases to store and retrieve data. Similarly, software components may include, but are not limited to, software packages, graphic user interfaces, and/or engines that can perform various computational tasks including, but not limited to data analysis, data aggregation, data comparison. In some embodiments, the software components are configured to provide correlations, generate plots and diagrams, provide predictions, prepare reports, etc. By way of example and not limitation, software components may include machine learning (ML) models, natural language process (NLP) models, other appropriate models, statistical analysis packages, facial recognition software, voice to text converters, and the like. The aforementioned examples are not limiting. Therefore, additional hardware and software components not listed above are within the spirit and the scope of this disclosure.

According to some embodiments, experience analyzer tool 100 is a dynamic (e.g., non-static) tool configured to analyze UX metrics within one or more experience journeys, identify UX gaps between participants, and provide tailored recommendations to improve UX when gaps are identified in the perceived experience between the participants. Experience analyzer tool 100 also enables a continuous improvement path via a constant monitoring feedback process. This means that, as new data and information become available as a result of the suggested recommendations, experience analyzer tool 100 continues to evolve and monitor the experience journey's progress.

In some embodiments, experience analyzer tool 100 allows business units and organization alike to identify and mitigate gaps between UX in terms of EX and CX in order to improve internal processes and operations. For example, a series of tasks or processes performed by an employee may be very pleasant or satisfying for the employee, but very frustrating for the customer or the stakeholder who is at the receiving end of the services provided. This situation can lead to a scenario where the employee has a satisfying user experience when performing the tasks or the processes, while the customer or the stakeholder has a frustrating user experience. As a result, the organization may lose business if the customer decides to take his/her business elsewhere. In a different scenario, the employee may be dissatisfied when performing one or more tasks or processes, but the customer or stakeholder may be very satisfied with the overall result of the process. In this scenario, the employee may decide to leave the organization or move to another business unit, which can in turn lead to higher attrition rate for the organization or the business unit. In the above exemplary and simplified scenarios, it is in the organization's best interest to evaluate the UX for its customers and employees, identify potential gaps (pain areas), and work towards improving the UX for all the parties involved. This means that certain tasks or processes may need to be adjusted or tuned so that both the employees and the customers (e.g., all the participants) are satisfied.

In some embodiments, each component of experience analyzer tool 100 can be tailored to best evaluate and analyze UX for each participant in an experience journey based on the needs of the organization or business unit. Experience analyzer tool 100 may also be customized to provide tailored solutions to help the organization or the business unit to achieve improved UX scores in terms of EX and CX. According to some embodiments, customization of experience analyzer tool 100 can be achieved via: (i) the experience journey definition (e.g., by adjusting the type and volume of information collected from the participants), (ii) the data modeling (e.g., how the data are interpreted, aggregated, and subsequently analyzed), (iii) the proposed recommendations (e.g., by appropriately identifying UX gaps), (iv) the monitoring process after or while the proposed recommendations are executed, or (iv) via any combination thereof. The aforementioned list is not exhaustive and additional ways to customize experience analyzer tool 100 may be available as discussed below.

According to some embodiments, an experience journey is first identified in experience journey metadata simulator 110. The experience journey identification includes, but may not be limited to, determining an experience journey map (EJM) and identifying the number of personas included in each EJM for the purposes of measuring UX in terms of, for example, EX and CX. In some embodiments, determination of the EJM includes identification of ETs along the experience journey and the type of data that will be collected in each ET for the purposes of UX assessment. At each ET, the personas have the opportunity to interact and develop a pleasant or an unpleasant experience in an experience journey represented by the respective EJM. Therefore, each ET can be used to assess each persona's perceived experience, EX or CX, for the interaction it represents. For example, an ET can be the time where a persona fills out an online form, talks to representative, or performs a particular task. Consequently, an EJM can include multiple ETs (e.g., 5, 10, 15, 20, etc.). By way of example and not limitation, an EJM can represent the process of filing a claim with an insurance company, where each ET is an action towards the completion of the claim process. For example, one ET can be when the customer initiates the claim, another ET can be when the insurance employee first processes the information provided by the customer, another ET can be when additional information is requested from the customer, etc.

The term "persona" refers to a predetermined participant role within an EJM that provides either EX or CX feedback. In the exemplary filing claim scenario provided above, two potential personas may be identified—a customer persona that provides CX feedback and a claim reviewer persona that provides EX feedback. Depending on the complexity of the EJM, additional personas may be identified as the number of involved participants increases. Accordingly, there is no limit to the number of personas assigned to an EJM. Further, CX or EX may be measured for each persona and its respective participants.

Figure 2:
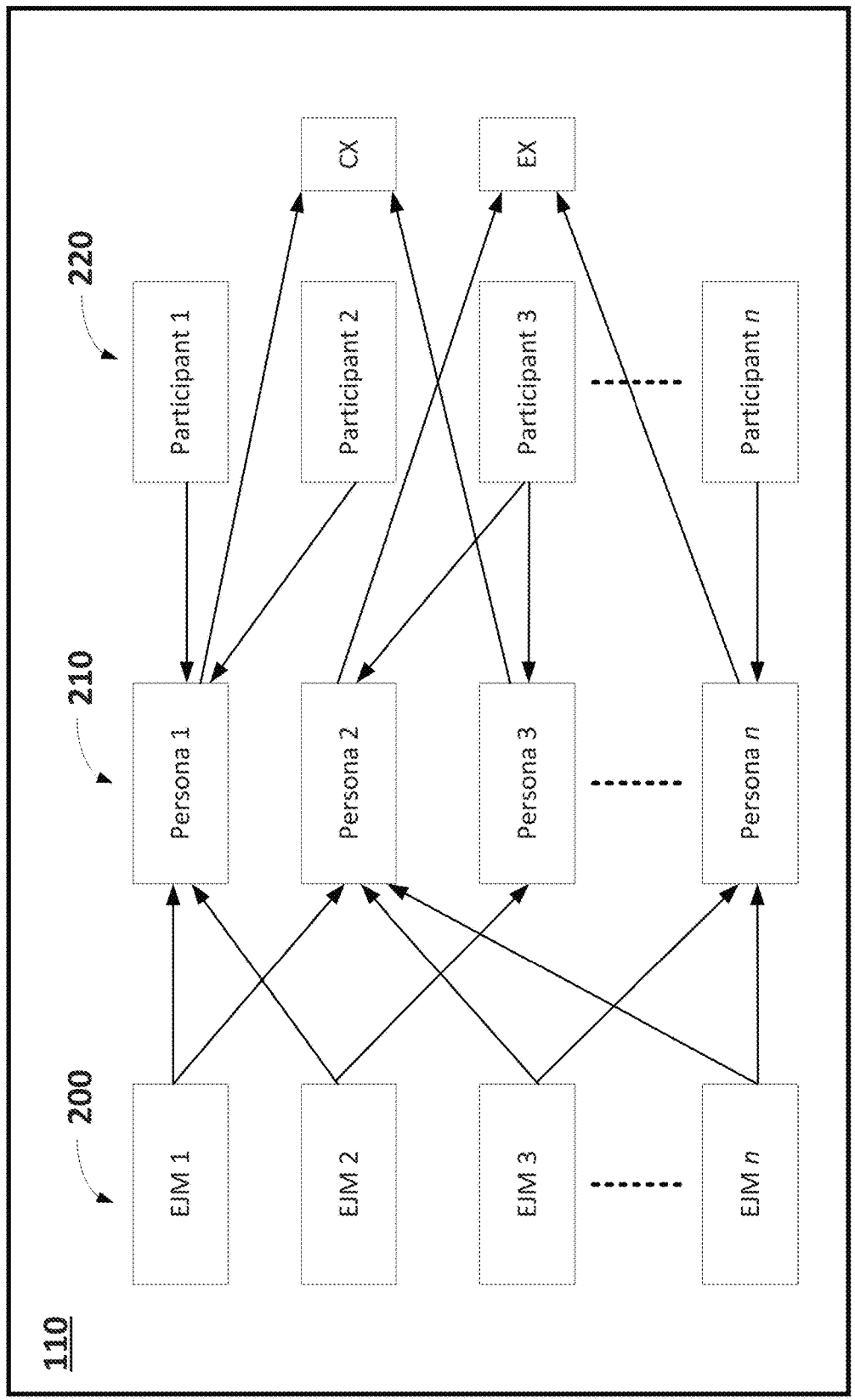
FIG. 2 shows the connections between experience journey maps, personas, and participants within an experience journey metadata simulator, according to some embodiments.

According to some embodiments, FIG. 2 shows how EJMs, personas, and participants are related to each other within experience journey metadata simulator 110. As shown in FIG. 2, one or more EJMs 200 and one or more personas 210 are identified in experience journey metadata simulator 110. According to some embodiments, each of the personas 210 may be part of one or more EJMs 200 as indicated by respective arrows. For example, persona 1 is part of two different EJMs (e.g., EJMs 1 and 2) while persona 3 is only part of EJM 2. In addition, each persona 210 may include multiple participants 220, like persona 1 which includes participants 1 and 2. Accordingly, each participant 220 may belong to one or more personas 210, such as participant 3 who belongs to both personas 2 and 3. Consequently, participant 3 can provide EX feedback as persona 2 and CX feedback as persona 3. According to some embodiments, a participant may belong to one persona profile in a first EJM, and to another persona profile in a second EJM, like participant 3. For example, participant 3 belongs to persona 2, which provides EX feedback in EJM 1, and to persona 3, which provides CX feedback, in EJM 2.

The examples provided above are not limiting and additional permutations and combinations are within the spirit and the scope of this disclosure. According to some embodiments, and based on the relationships provided for personas 210 and participants 220, UX may be aggregated in a number of ways within an EJM. For example, UX may be aggregated by persona, by CX and EX, by participant, or any combination thereof. In some embodiments, EJMs 200, personas 210, participants 220, and CX and EX may represent potential aggregation layers by which UX data can be aggregated, analyzed and presented.

According to some embodiments, FIG. 9 shows an exemplary participant list prepared for several participants across different EJMs. The participant list may include additional or fewer information than the ones shown in FIG. 9. The information listed can be further used to dissect and analyze UX data (in addition to the aggregation layers discussed above in FIG. 2) by location, by division, by business unit, or combinations thereof.

In referring to FIG. 1, once the EJMs and the corresponding personas and participants are identified, data are extracted for each ET in every EJM via the dynamic experience ingestion layer 120, and subsequently, the extracted data are forwarded for analysis to experience analytics engine 130.

Figure 3:
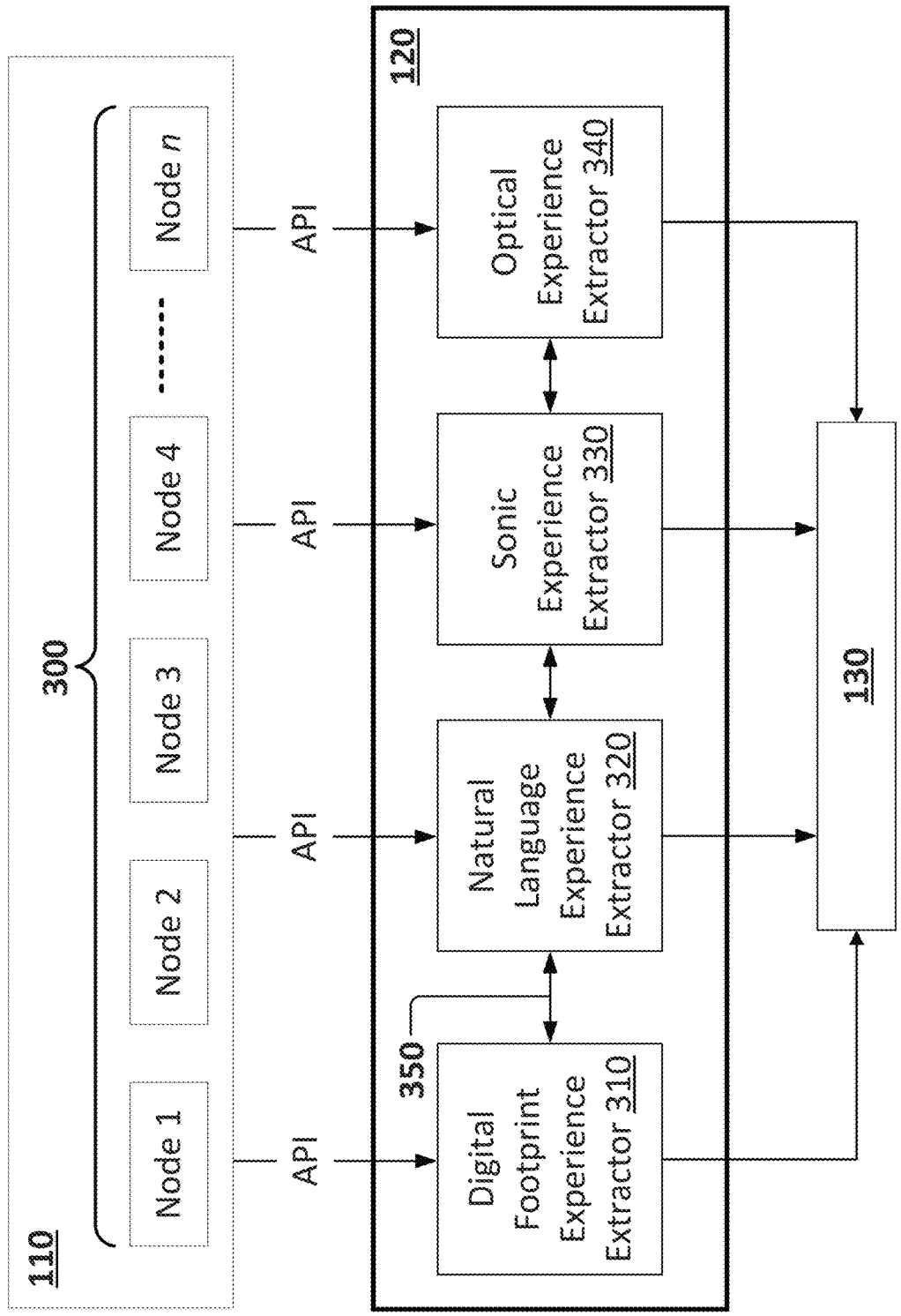
FIG. 3 shows a data extraction process within a dynamic experience ingestion layer, according to some embodiments.

FIG. 3 shows the data extraction process within dynamic experience ingestion layer 120. According to some embodiments, dynamic experience ingestion layer 120 is an input module where different types of input types are being collected, stored, tagged, and prepared for further analysis. In some embodiments, dynamic experience ingestion layer 120 includes, but may not be limited to, a digital footprint experience extractor 310, a natural language experience extractor 320, a sonic experience extractor 330, and an optical experience extractor 340. Each extractor focuses on a different type of data. The representation of dynamic experience ingestion layer 120 shown in FIG. 3 is not limiting; for example, some extractors may be combined. The extractors in dynamic experience ingestion layer 120 collect data via, for example, application program interfaces (APIs) from various input sources 300 from experience journey metadata simulator 110. Input sources 300 are represented in FIG. 3 as nodes for convenience. However, nodes may correspond to participants, who provide experience feedback via a feedback request process. In addition, nodes may correspond to one or more system logs of system of transaction and system of engagement layers used by the organization to gauge key performance indicators (KPIs) impacting UX on daily basis. In some embodiments, a first subset of nodes may correspond to one or more participants and a second subset of nodes may correspond to one or more system logs.

Each of the extractors in dynamic experience ingestion layer 120 is configured to parse and extract relevant information from different types of data. For example, digital footprint experience extractor 310 receives and identifies relevant information from system logs; natural language experience extractor 320 receives, parses, and identifies relevant information from text inputs; sonic experience extractor 330, receives and converts audio input to text, which is then processed by natural language experience extractor 320 to extract any relevant information; and optical experience extractor 340 receives and processes visual inputs to identify, for example, facial expressions that suggest frustration, satisfaction, neutrality, etc. In some embodiments, as indicated by two-way arrows 350, one or more extractors may work together to process and extract information. For example, as mentioned above, sonic experience extractor 330 and natural language experience extractor 320 may work together to process audio inputs. Similarly, digital footprint experience extractor 310 and natural language experience extractor 320 may work together to identify meaningful strings of text in the received system logs and to then extract any experience-related information. In yet another example, natural language experience extractor 320, sonic experience extractor 330, and optical experience extractor 340 may work together to process audio and visual components of video inputs.

The term "relevant information" as used above, refers to information that is related to UX or can be used to measure UX experience. For example relevant information may be indicative of the UX state and may be subsequently classified in experience analytics engine 130 as positive, negative, or neutral.

By way of example and not limitation, questionnaires can be used to collect text responses, audio responses, video responses, or combinations thereof from each participant. In some embodiments, the questionnaires may have a convenient format—for example, the questionnaires can be web-based forms with clickable items, drop down menus, slider selectors, or any other suitable form of input. In some embodiments, the experience data are collected and stored in data bases from where they can be accessed, aggregated, and analyzed at a later time in experience analytics engine 130.

Figure 10:
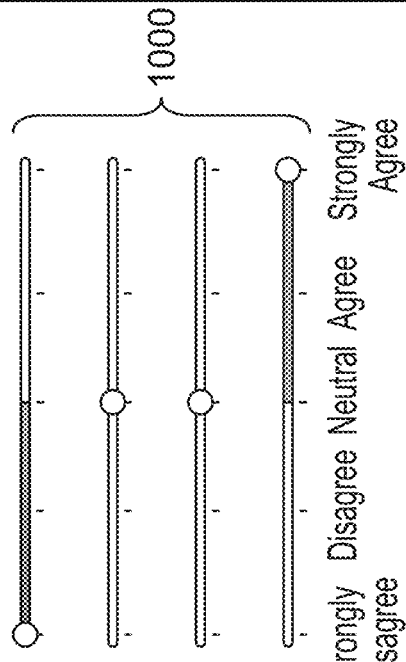
FIG. 10 is an exemplary assessment page from a questionnaire presented to participants as part of a user experience feedback process, according to some embodiments.

According to some embodiments, FIG. 10 shows an exemplary assessment page from a questionnaire presented to participants as part of a UX feedback process. In the example of FIG. 10, the participants can provide their experience-related feedback via sliders 1000 for each corresponding statement provided. In some embodiments, the sliders can be placed on or at any position between the labels "Strongly Agree", "Disagree", "Neutral", "Agree", and "Strongly Agree". In the background, a respective score is assigned to the position of each slider. As shown in the lower left corner of FIG. 10, the participants have the option to provide additional feedback in the form of text, audio, or video as indicated by respective descriptive icons 1010. The example provided in FIG. 10 is not limiting and the questionnaires may have a different format from the one shown in FIG. 10. For example, the questionnaire may include additional questions, other clickable items, drop down menus, radio buttons, and the like to collect UX-related information.

As discussed above, dynamic experience ingestion layer 120 collects experience input from a variety of input sources 300 shown in FIG. 3. By way of example and not limitation, dynamic experience ingestion layer 120 may collect text responses from a first number of participants, video responses from a second number of participants, audio responses from a third number of participants, and digital footprint data from a fourth number of participants. In some embodiments, dynamic experience ingestion layer 120 may collect text responses from all the participants and video responses or other types of data from a subset of the participants. Therefore, different combinations and permutations of input data are possible and within the spirit and the scope of this disclosure. According to some embodiments, each type of experience input is analyzed and quantified in experience analytics engine 130 using appropriate algorithms, machine learning (ML) models, and statistical methodologies discussed below.

Figure 4:
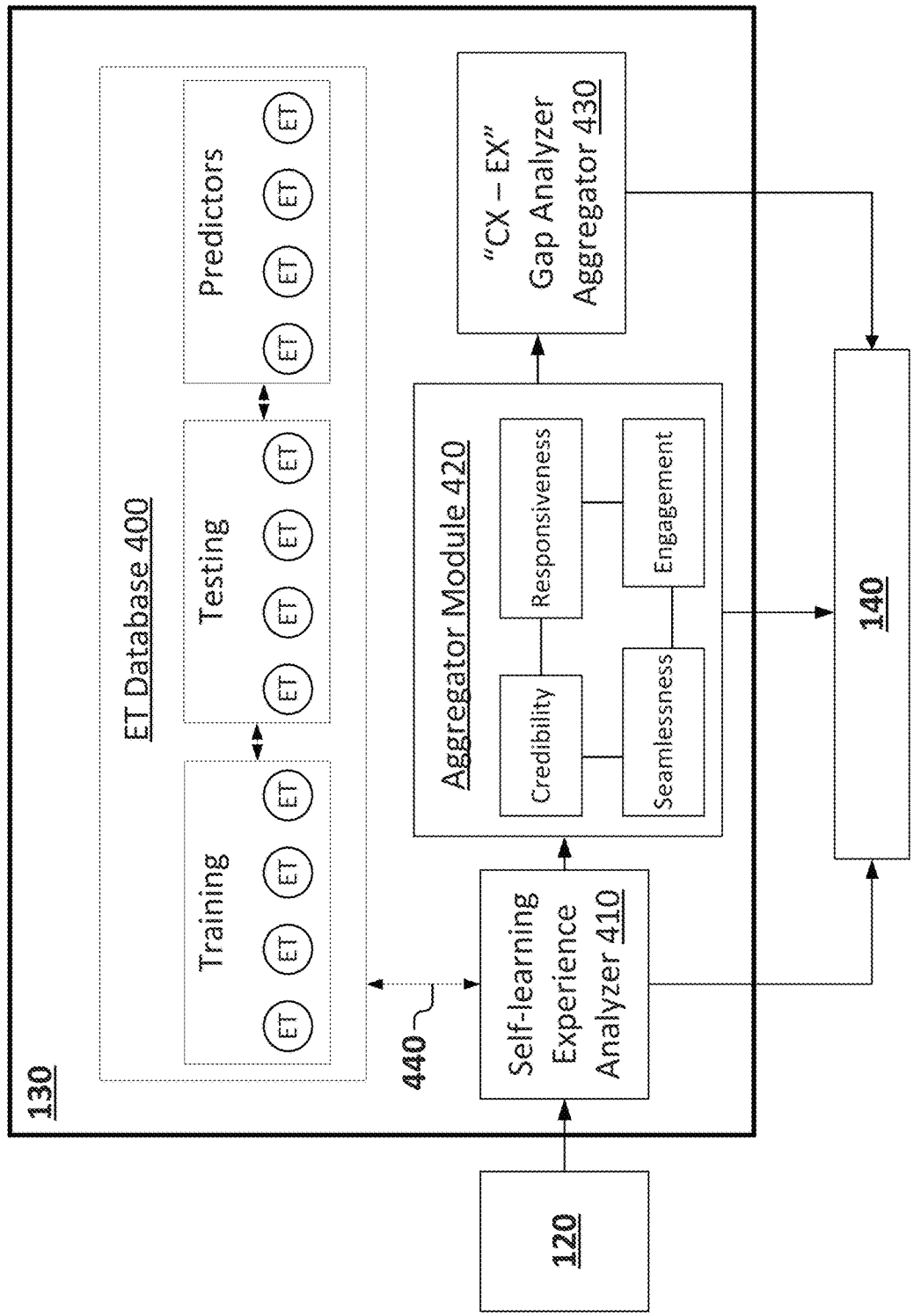
FIG. 4 shows components of an experience analytics engine, according to some embodiments.

FIG. 4 shows the main modules of experience analytics engine 130 according to some embodiments. As shown in FIG. 4, experience analytics engine 130 includes an ET database 400, a self-learning experience analyzer 410, an aggregator module 420, and a CX-EX gap analyzer aggregator 430 (thereafter referred to as gap analyzer aggregator 430). According to some embodiments, ET database 400 stores historical ET data from one or more EJMs. The data in ET database 400 can be used as training, testing, or predictor datasets for the one or more models in self-learning experience analyzer 410. Aggregator module 420 uses the data output from self-learning experience analyzer 410 to quantify, measure, and classify UX data in terms of a four dimension matrix. According to some embodiments, the four dimensions are credibility, responsiveness, seamlessness, and engagement. Finally, gap analyzer aggregator 430 uses the findings from aggregator module 420 to identify which ETs show gaps between CX and EX. Subsequently, the outputs from self-learning experience analyzer 410, aggregator module 420, and gap analyzer aggregator 430 are provided to experience reporting cockpit 140.

In some embodiments, the data in experience touchpoint database 400 are dynamically updated from self-learning experience analyzer 410 as additional source data from dynamic experience ingestion layer 120 become available. This is shown by double-arrow connector 440 between experience touchpoint database 400 and self-learning experience analyzer 410.

As discussed above, aggregator module 420 quantifies, measures, and classifies UX data in terms of the four dimensions: credibility, responsiveness, seamlessness, and engagement (collectively referred to as CRSE). In the context of UX, credibility gauges how trustworthy a participant thinks his/her interaction is at a given ET—for example, how trustworthy is the information provided/received at a particular ET. In a similar context, responsiveness gauges the element of timing. For example, something received on time is more valuable to a participant than something received when the urgency of time and the relevance of a timely action has passed. For example, responses or output received by a participant in a given ET within the expected timeframe enhances a positive experience, while responses or output received outside the expected time frame can create negative experiences. Seamlessness gauges whether a participant feels that his/her experience was seamless—e.g., without gaps, abrupt interruptions, or unexplained wait times. Lastly, engagement gauges how engaged or interested a participants felt during his/her interaction at a given ET. For example, in the case of a report, it could mean that the quality of the information provided makes the participant feel that the content is useful and presented in an meaningful manner or the other way around. In the case of a form or a template, it could mean that the instructions provided are clear, or confusing and ambiguous. In some embodiments, tangible experience scoring is provided by dimensions such as credibility and responsiveness, while intangible scoring is provided by dimensions such as seamlessness and engagement.

In the following section, an exemplary methodology is provided on how the source data from dynamic experience ingestion layer 120 are analyzed within the experience analytics engine 130, and more specifically by self-learning experience analyzer 410.

Text Responses

As discussed above, during assessment, participants may provide text comments for each ET in the EJM that is applicable to their personas (e.g., roles). A sentiment analysis is subsequently performed on the basis of text classification using the following tags: Positive, Negative, or Neutral. Sentiment analysis refers to the use of natural language processing, text analysis, computational linguistics, and biometrics to systematically identify, extract, quantify, and study affective states and subjective information.

In some embodiments, self-learning experience analyzer 410 may use one or more NLP models in which text classifiers parse and sort text by sentiment, topic, and customer intent. By way of example and not limitation, this task can be carried out using a bag of words, where a vector is assigned to the frequency of a word within a predefined list of words. Training data from ET database 400 can be used to train the one or more text classifiers. For example, once data are vectorized, the text classifier models are fed training data that consists of feature vectors for each text sample and tag. With enough training samples, the NLP model is able to make accurate predictions based on new source data from dynamic experience ingestion layer 120. In some embodiments, manual intervention is possible to avoid incorrect classification. The text classifier models can self-learn from the manual intervention and improve their future predictions when analyzing new text responses. In some embodiments, and prior to receiving actual data, the predictions of the one or more NLP models can be tested using testing data from ET databased 400. Predictions based on new data are stored in the predictors dataset of ET data base 400.

In some embodiments, the Naive Bayes algorithm can be used as a probabilistic classifier that makes use of Bayes' theorem—a rule that uses probability to predict the tag of a text based on prior knowledge of conditions that might be related. The Naive Bayes algorithm then calculates the probability of each tag for a given text, and predicts the tag with the highest probability by using any combination of the following techniques: (i) removing "stop words"—i.e., commonly used words that do not add value, such as "able to", "either", "else", "ever", and the like; (ii) lemmatizing words—i.e., grouping different inflections of the same word such as "draft", "drafted", "drafts", "drafting", and the like; (iii) using n-grams—i.e., the probability of the appearance of a word or a sequence of words of 'n length' within a text; and (iv) using Term Frequency-Inverse Document Frequency (TF-IDF)—a metric that quantifies how important a word is to a document in a document set. The TF-IDF value increases proportionally to the number of times a specific word appears in a document and is offset by the number of documents that contain said word; this compensates for the fact that some words appear more frequently in general than others.

Audio Response

As discussed above, the participants have the option of recording audio messages to share their experience. By way of example and not limitation, the speech-to-text process conversion—also referred to as voice-to-text, voice recognition, or speech recognition—may occur in sonic experience extractor 330 using any suitable software application. In some embodiments, the transcribed text is then forwarded to natural language experience extractor 320 where relevant information is extracted. Subsequently, the output from natural language experience extractor 320 is forwarded to self-learning experience analyzer 410 for classification and analysis as discussed above.

Video Response

As discussed above, the participants may have the option to provide their experience input as a video response. Natural language experience extractor 320, sonic experience extractor 330, and optical experience extractor 340 work together to process the audio and visual components of the video input. For example, a video response is split into an audio component (e.g., processed by sonic experience extractor 330 and natural language experience extractor 320 as discussed above) and a video component (e.g., processed by optical experience extractor 340). In some embodiments, optical experience extractor 340 is configured to identify facial expressions. The output from optical experience extractor 340 is then forwarded to self-learning experience analyzer 410, which uses a ML model to analyze and classify the facial expressions. By way of example and not limitation, the ML model in self-learning experience analyzer 410 may use any appropriate technology—for example, facial expression recognition (FER) technology. FER is an image classification method located within the wider field of computer vision. In image classification problems, images must be algorithmically assigned a label from a discrete set of categories. In FER systems specifically, the images are of human faces and the categories are a set of emotions. ML approaches to FER require a set of training image examples, each labelled with a single emotion category. A standard set of seven emotion classifications are often used; namely, anger, disgust, fear, happiness, sadness, surprise, and neutral.

An image pre-processing stage may be necessary to perform image transformations such as scaling, cropping, or filtering images. Image pre-processing can also be used to accentuate relevant image information, like cropping an image to remove a background, and to augment a dataset, for example to generate multiple versions from an original image with varying cropping or transformations applied. A feature extraction stage can be later used to identify more descriptive parts of an image—e.g., finding information which are indicative of a particular class, such as the edges, textures, or colors.

Digital Footprint

As discussed above, digital footprint experience extractor 310 imports inputs from various system logs. In some embodiments, once the inputs are collected, self-learning experience analyzer 410 uses statistical analysis to baseline (e.g., gauge) and monitor KPIs that impact the user experience on a day to day basis. In some embodiments, KPIs are indicative of the system health. Changes in the baseline are identified and flagged when considered abnormal—for example, when a KPI value departs from its baseline for no obvious reason. Therefore, changes that are expected (e.g., are the result of a known cause) are ignored, while sudden and unexpected changes that are the result of an unknown cause are promptly identified and reported. System health can have a nonlinear and temporally dependent relationships with many entries. Therefore, patterns may gradually emerge over the course of days on many types of systems.

In some embodiments, a neural network model may be trained to identify these nonlinear indications of health, impending dangers, and risk conditions. In some embodiments, an entire time window of log entries of considerable length are entered to the neural network to display the likelihood of an impending failure or quality control issue. All log entries are potentially useful input data provided that there are correlations between informational messages, warnings, and errors. Sometimes the correlation is strong and therefore critical for maximizing the learning rate.

In some embodiments, self-learning experience analyzer 410 may also include an inbuilt algorithm methodology to aggregate all the ingestions collected through the above ML models. As an example, FIG. 11 shows the feedback collected from one participant for a given sub-process within the EJM. A step (e.g., an ET) from the sub-process is categorized into positive negative and neutral experiences using ML and NLP models, like the ones discussed above. The ingestions from all the categories are multiplied by a principal component factor, which is set to a different value for each category—e.g., 2 for positive, 0 for neutral, and −2 for negative. Subsequently, an ingestion quotient for each category and a total ingestion quotient (e.g., the sum of all the ingestion quotients across all categories) is calculated. The total ingestion quotient (e.g., −14) is then divided by the total number of ingestions (e.g., 40) to derive an ingestion score for the sub-process step (e.g., for a given ET). In this particular example, the ingestion score for this ET would be −0.4. In some embodiments, an ingestion score can be calculated for each ET within the EJM. Once all the ingestions scores are calculated for all the ETs, an overall output quotient is calculated for the entire journey map.

As discussed above, aggregator module 420 uses the output from self-learning experience analyzer 440 to quantify, measure, and classify UX in terms of CRSE. CRSE scores can be aggregated and presented in any number of ways that provide meaningful correlations. By way of example and not limitation, CRSE scores can be aggregated by ET across all or selected number of personas, by persona across all or selected number of ETs, by persona across all or some participants for one or more ETs, by CX and EX across all ETs, by CX and EX across all the personas, and any combinations thereof.

Subsequently, the output from aggregator module 420 is used by gap analyzer aggregator 430 to identify gaps between CX and EX for each ET, personas, participants, EJMs, or any combinations thereof. All this information is forwarded to experience reporting cockpit 140 where the findings are plotted in a digestible format so that root cause analysis can occur. According to some embodiments, experience reporting cockpit 140 is a module that performs data factorization and in-depth analysis for the pain areas—e.g., areas where CX and EX gaps have been identified. Further, experience reporting cockpit 140 identifies different types of issues including, but not limited to, data-related issues, technology-related issues, and process-related issues within each step (e.g., ET) of the EJM so that customized recommendation solutions are generated to address the specific problem areas.

Figure 5:
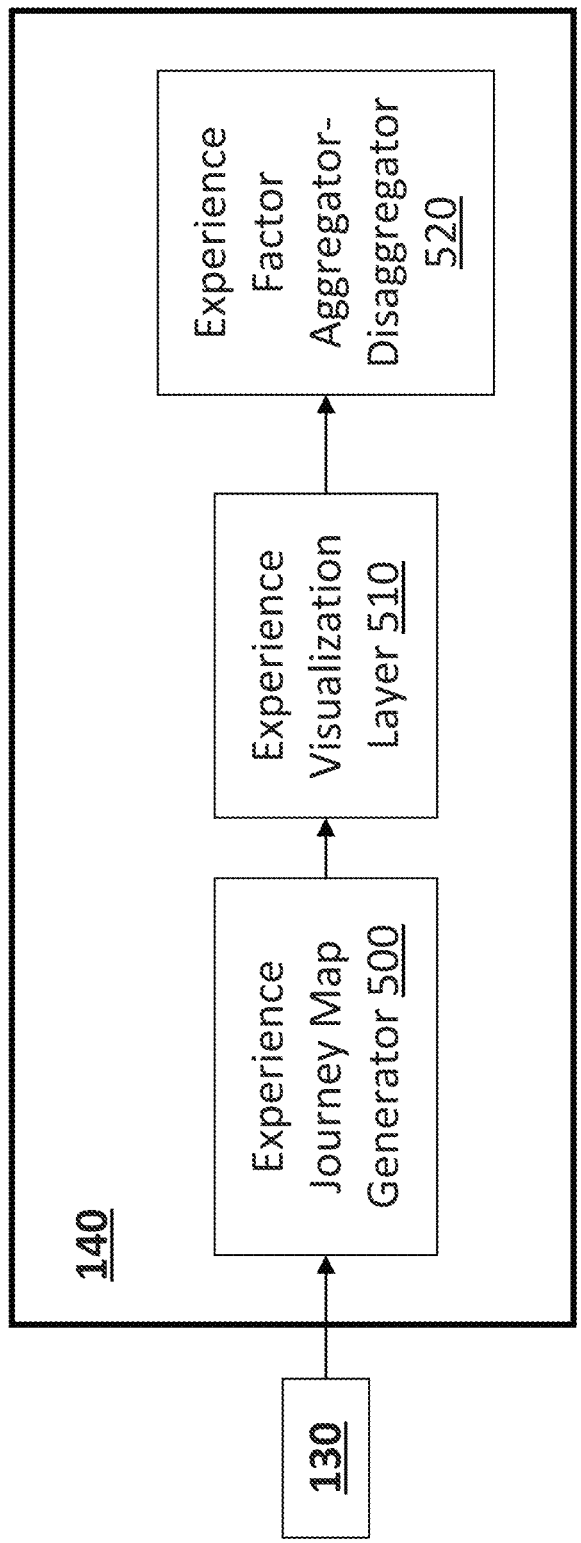
FIG. 5, shows components of an experience reporting cockpit, according to some embodiments.

According to some embodiments, FIG. 5 shows the modules of experience reporting cockpit 140 discussed in FIG. 1. In some embodiments, experience reporting cockpit 140 is a reporting layer in which data factorization and in-depth root cause analysis occur. As shown in FIG. 5, experience reporting cockpit 140 includes an EJM generator 500, an experience visualization layer 510, and an experience factor aggregator/disaggregator 520.

Figure 12:
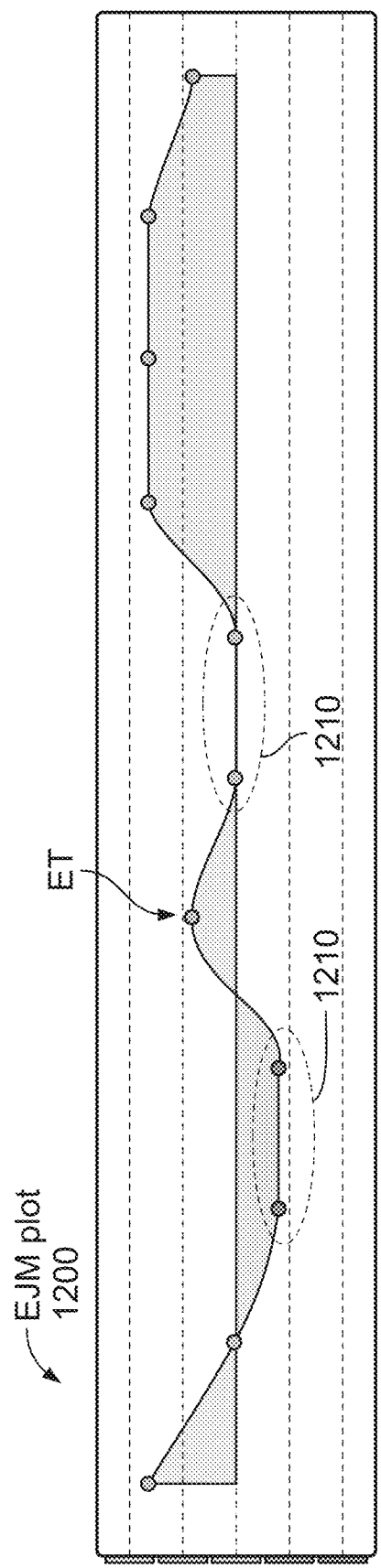
FIG. 12 is an exemplary experience journey map plot generated by an experience journey map generator, according to some embodiments.

In some embodiments, EJM generator 500 can generate EJM (Experience Journey Map) views of an entire end to end journey as a function of its ETs. Each ET in the EJM can be plotted, for example, against a color-coded y-axis where each color may correspond to a statement that summarizes the UX for that ET. By way of example and not limitation, the color-coded indicators may correspond to statements such as "Inspiring", "Satisfactory", "Neutral", "Apathetic", Frustrating", or any other collection of suitable statements that are representative of the perceived UX. By way of example and not limitation, FIG. 12 shows an exemplary experience journey map plot 1200 generated by EJM generator 500. Based on this representation, ETs that require attention are quickly identified. For example, the ETs identified with dashed circles 1210 require improvement so that the overall UX across the EJM is enhanced.

The EJM shown in FIG. 12 is not limiting. For example, instead of color coding the y-axis, the y-axis may be populated with statements that define the perceived UX (e.g., Inspiring, Satisfactory, Neutral, Apathetic, Frustrating), or with normalized numerical values (e.g., from 2 to −2) where each numerical value is, for example, indicative of the quality or other metric of the perceived UX (e.g., 2 being the highest and −2 being the lowest). The aforementioned representations and other equivalent representations of the EJM are within the spirit and the scope of this disclosure.

In referring to FIG. 1, experience visualization layer 510 is a module that uses the output from EJM generator 500 to provide a wide variety of data graphs (e.g., dashboards, standard deviation graphs, noise boards) that offer a quick and easy way to identify gaps between EX and CX. In some embodiments, the data graphs are visual aids that identify problem areas requiring attention and improvement. Dashboards may analyze and quantify experience in terms of overall UX and CX-EX across the four dimensions (e.g., CRSE), perspectives, and scales. As an example, the data graphs generated by experience visualization layer 510 can provide detail information about each EJM, and allow a user to view the UX score at the dimension level (e.g., C, R, S, and E) to identify improvement opportunities and analyze gaps between EX and CX.

As shown in FIG. 5, the output from experience visualization layer 510 is used as input in experience factor aggregator/disaggregator 520. In some embodiments, experience factor aggregator/disaggregator 520 provides the opportunity to perform root cause analysis and understand the reasons behind the differences in the perceived UX between participants across one or more EJMs. In some embodiments, this can be achieved by first defining factors or causes, and later by aggregating and accumulating the data under the defined factors. In some embodiments, the factors or causes have an one-to-one correlation with the four dimensions (e.g., C, R, S, and E). For example, each factor or cause can be one of the four dimensions—e.g., C, R, S, or E. Subsequently, the data are analyzed under each factor individually. In some embodiments, it is possible to dissect the data under each factor to their individual components, across different EJMs and steps (e.g., ETs), and to identify where UX suffers. The aforementioned data factorization identifies the reasons behind gaps found between EX and CX.

In referring to FIG. 1, the output from experience reporting cockpit 140 is used in experience enhancement recommendation engine 150, which in turn prepares recommendations for the ETs identified in the analysis performed by experience reporting cockpit 140.

According to some embodiments, the recommendation process starts with the selection of ETs having unsatisfactory UX scores and it is desirable that they receive recommendations. In some embodiments, the entire population of the ETs with unsatisfactory UX scores may be selected to receive recommendations. Alternatively, only one or more subsets of the entire population of the ETs with unsatisfactory UX scores may be selected to receive recommendations. Once the ET selection is complete, experience enhancement recommendation engine 150 selects appropriate recommendations tailored for each selected ET from a recommendation depository. In some embodiments, the recommendation depository consists of one or more databases with recommendation proposal data. Subsequently, the recommendation proposal data are properly categorized (e.g., binned) based on the root cause analysis performed in experience reporting cockpit 140. By way of example and not limitation, the categories in which the recommendation proposal data are binned can be the same as the ones identified in noise boards generated by experience reporting cockpit 140. For example, the categories can be data-related, technology-related, process-related, or any other suitable categories. Although the provided solutions or recommendations can be autogenerated, discretion to deselect any solution is allowed. Further, the proposed solutions may provide multiple scenarios for future transformation consideration.

Figure 6:
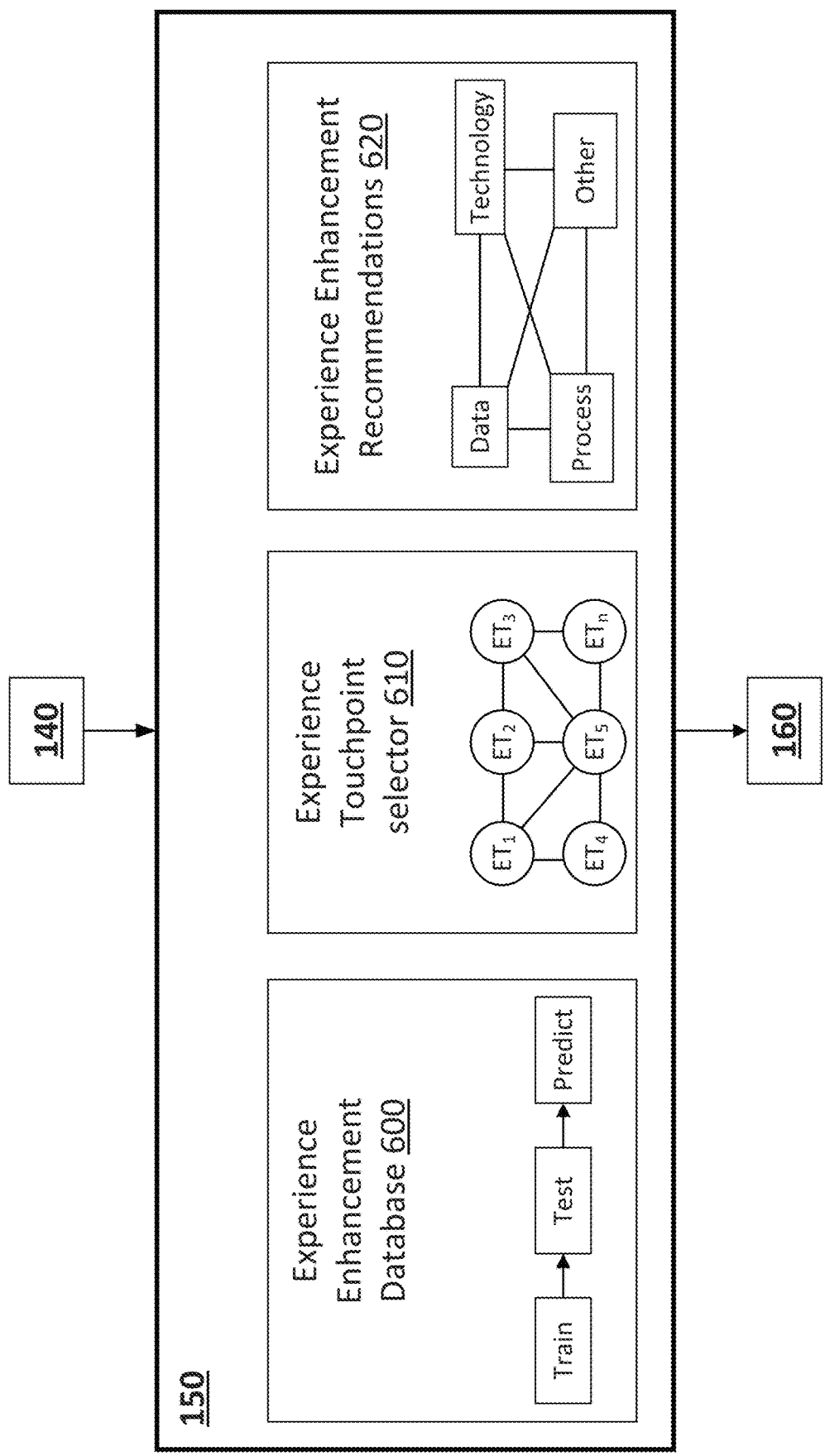
FIG. 6, shows components of an experience enhancement recommendation engine, according to some embodiments.

According to some embodiments, FIG. 6 shows the modules of experience enhancement recommendation engine 150 that are responsible for the operations described above. As shown in FIG. 6, experience enhancement recommendation engine 150 includes an experience enhancement database 600, an ET selector 610, and an experience enhancement recommendations 620. According to some embodiments, the ET selection occurs in ET selector 610, the selection of the tailored recommendations for each selected ET occurs from experience enhancement database 600, and the binning and presentation of the tailored recommendations occurs in experience enhancement recommendations 620.

By way of example and not limitation, experience enhancement database 600 can include one or more databases. For example, experience enhancement database 600 can include a training database where training data are stored and used to train the predictive models used for the recommendations, a test database where test data are stored and used to evaluate the accuracy of the predictive models, and a prediction database where prediction data from the predictive models are stored and used as the main recommendation depository. In some embodiments, the predictive models using experience enhancement database 600 are ML models located in self-learning experience analyzer 410 shown in FIG. 4.

As shown in FIG. 6, experience enhancement recommendations 620 bins the recommendation proposal data (e.g., the recommendations) into predetermined categories indicative of the recommendation content. By way of example and not limitation, these predetermined categories can be process-related, technology-related, data-related, and/or related to another appropriate category. As an example, data-related recommendations may include actions that improve the data accuracy in one or more documents or forms used in a particular step. In another example, process-related recommendations may include a new process protocol, which adds new checkpoints or removes unnecessary checkpoints to a step, or incorporates a new mechanisms to improve the process. Technology-related recommendation may include new tools and software application that enhance the UX and so on. Experience enhancement recommendations 620 may include fewer or additional categories not shown in FIG. 6. The categories presented herein are not limited to the examples provided.

Figure 13:
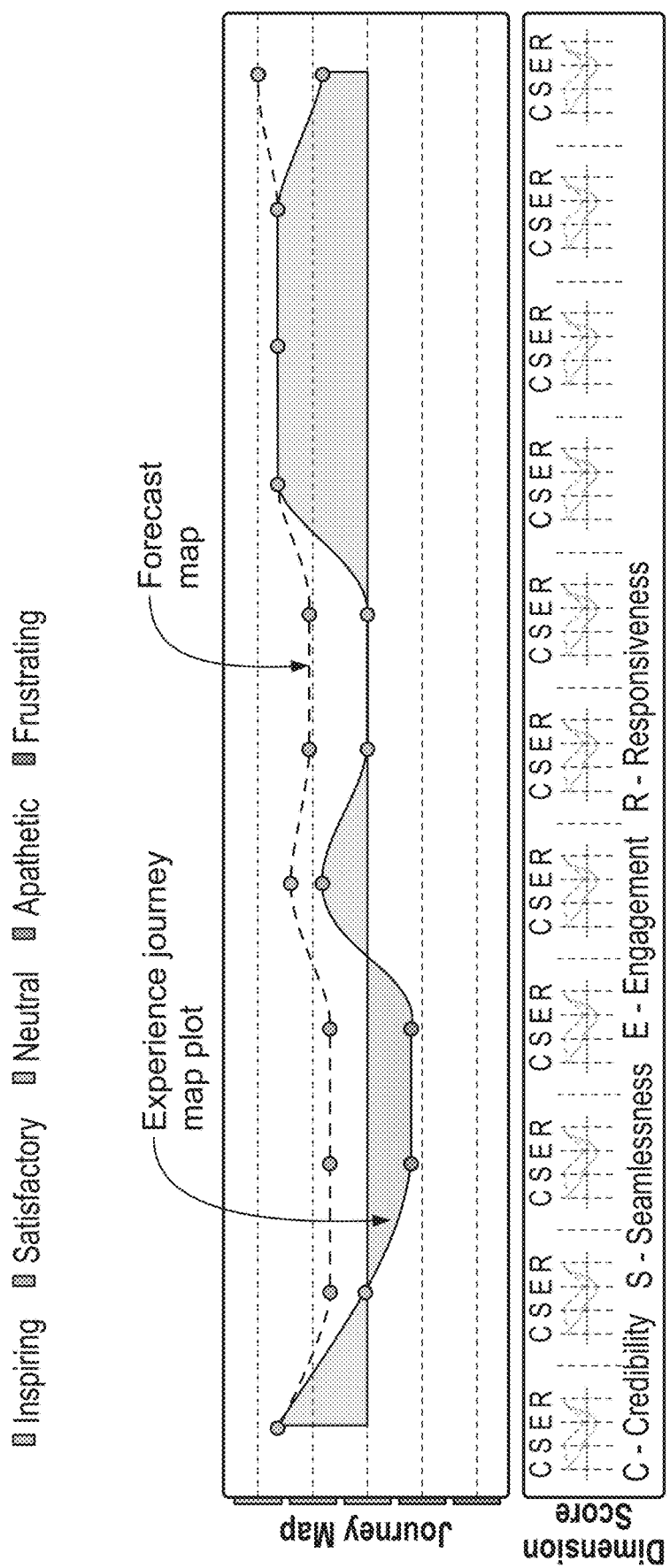
FIG. 13 shows a simulated future experience journey map for the experience journey map plot shown in FIG. 12, according to some embodiments.

In some embodiments, experience enhancement recommendation engine 150 can generate a simulated future experience journey map (SFEJM) for each EJM. The SFEJM provides predictions on potential UX gains across poorly performing ETs assuming execution of the suggested recommendations. By way of example and not limitation, FIG. 13 shows a SFEJM for EJM 1200 shown in FIG. 12. In addition to SFEJMs, projected experience measurements are also generated for each ET across all four dimensions, CRSE, as shown in the bottom portion of FIG. 13. Similar projected experience measurements are generated for CX and EX. The SFEJM and projected experience measurements are review tools that offer a quick overview of potential UX or CX and EX gains across each EJM, ET, across dimensions and participants.

Examples of Methods for the Calculation of Recommendations

The solutions and recommendations offered by experience enhancement recommendation engine 150 are based on co-relation with multiple factors including, but not limited to, current process experience score, scale of business, technology maturity, appetite for investment and the like. A correlation could be positive or negative, with a positive correlation corresponding to a situation where both variables move in the same direction and a negative correlation corresponding to a situation where the variables move in opposite directions—e.g., the value of one variable increases while the value of the other variable decreases. Correlation can also be neutral or zero, meaning that the variables are not related. In some embodiments, Spearman's rank-correlation coefficient is used to quantify how monotonic the relationship is between the two variables—e.g., whether an increase in x results in an increase in y. In some embodiments, a positive correlation means that both variables change in the same direction, a neutral correlation means there is no, or a weak, relationship in the change of the variables, and negative correlation means that the variables change in opposite directions.

In some embodiments, experience enhancement recommendation engine 150 facilitates manual intervention in case of an incorrect recommendation, and based on it, the predictive model has the ability learn from this intervention and improve future predictions.

In some embodiments, there can be a linear or a non-linear relationship between different variables in the datasets. The Pearson correlation coefficient (PCC) is used to summarize the strength of the linear correlation between two data samples. The PCC is calculated as the covariance of the two variables divided by the product of the standard deviation of each data sample. It is the normalization of the covariance between the two variables that provides an interpretable score. The use of mean and standard deviation in the calculation suggests the need for the two data samples to have a Gaussian or Gaussian-like distribution. The result of the calculation—the correlation coefficient—is interpreted to provide insights into the relationship between the two data samples.

The coefficient returns a value between −1 and 1 that represents the limits of correlation from a fully negative correlation to a fully positive correlation. A value of 0 corresponds to no correlation. The value must be interpreted, where often a value below −0.5 or above 0.5 indicates a notable correlation, and values between 0 and these values—0.5 and −0.5—suggests a less notable correlation.

When two variables are related by a nonlinear relationship and have a non-Gaussian distribution, Spearman's correlation coefficient (Spearman's $\rho$) is used to summarize the strength between the two data samples. This test of relationship can also be used if there is a linear relationship between the variables, but will have slightly less power (e.g., may result in lower coefficient scores). Like with the Pearson correlation coefficient, the scores are between −1 and 1 for perfectly negatively correlated variables and perfectly positively correlated, respectively.

In some embodiments, instead of calculating the coefficient using covariance and standard deviations on the samples themselves, the coefficient can be calculated from the relative rank of values on each sample. This approach is used in non-parametric statistics—e.g., in statistical methods where the data are not assumed to have a particular distribution, such as Gaussian.

Even though, a linear relationship between the variables is not assumed, a monotonic relationship is assumed—e.g., an increasing or decreasing relationship between the two variables. If the distribution and possible relationships between two variables is provided, Spearman correlation coefficient may be used.

By way of example and not limitation, for a given sub-process, persona, and step, there can be different quotient for experience dimensions and, accordingly, experience enhancement recommendation engine 150 automatically recommends appropriate solutions to enhance UX.

According to some embodiments, once the recommendations have been generated and provided by experience enhancement recommendation engine 150, the execution of the recommendations commences outside of experience analyzer tool 100 shown in FIG. 1. However, experience analyzer tool 100, via experience execution monitoring center 160, continues to monitor and track the progress of the execution and detects whether the suggested recommendations work as intended or additional corrective actions are required. For example, experience execution monitoring center 160 of experience analyzer tool 100 may track over time how the ETs in each EJM are behaving in terms of UX after the suggested recommendations have been executed or while the recommendations are being executed.

In some embodiments, experience execution monitoring center 160 identifies whether and where improvement or deterioration in UX occurs. According to some embodiments, this is accomplished with the help of external and internal modules to experience analyzer tool 100. For example, experience execution monitoring center 160 may utilize an external digital experience monitoring module. More specifically, the external digital experience monitoring system can collect data from different ETs across respective EJMs and provide feedback to experience execution monitoring center 160 and to other internal modules of experience analyzer tool 100, like dynamic experience ingestion layer 120.

Figure 7:
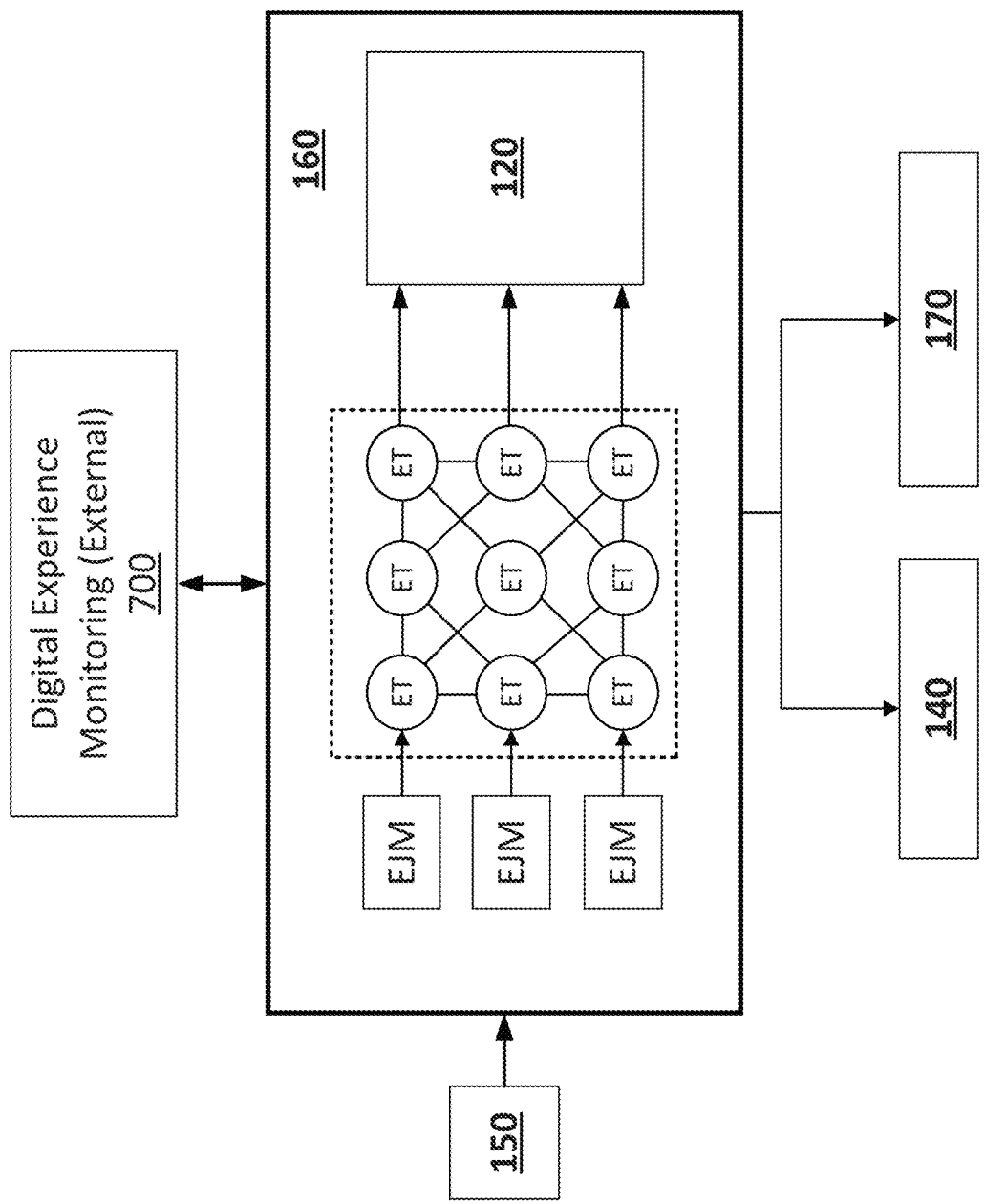
FIG. 7 shows the connections of an experience execution monitoring center with other components within and outside an experience analyzer tool, according to some embodiments.

According to some embodiments, FIG. 7 shows how experience execution monitoring center 160 interacts with other modules within and outside experience analyzer tool 100. In referring to FIGS. 1 and 7, the output of experience execution monitoring center 160 is used as an input to both experience reporting cockpit 140 and to continuous experience monitoring engine 170. By way of example and not limitation, updated data for each EJM and its respective ETs are recorded and delivered via digital experience monitoring system 700 to dynamic experience ingestion layer 120 for processing and preparation using the methods discussed above. Subsequently, the processed data are forwarded to experience enhancement recommendation engine 150 for further analysis. If additional recommendations for UX improvement are necessary, these additional recommendations will be provided for execution via experience execution monitoring center 160.

Figure 8:
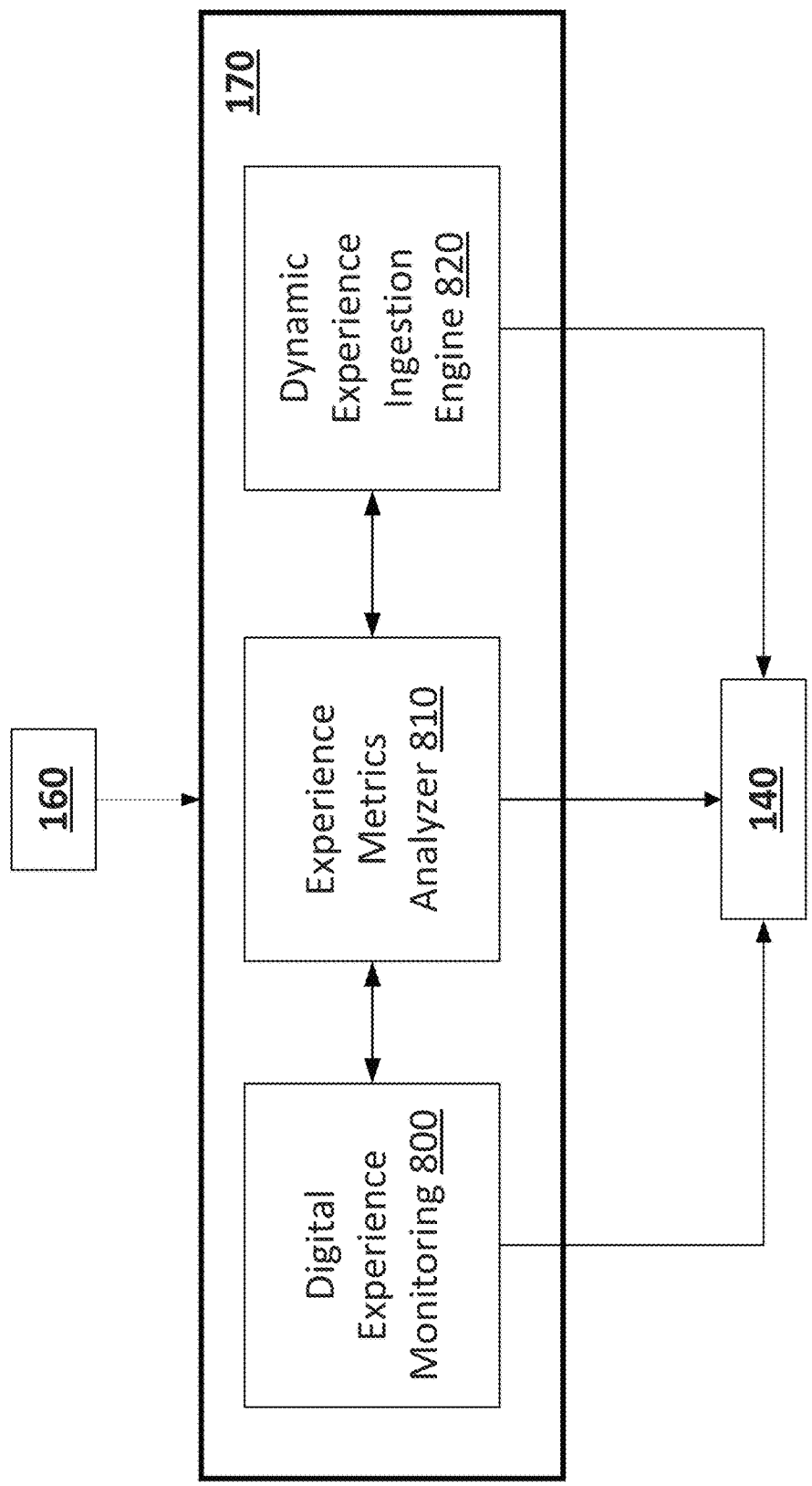
FIG. 8 shows components of a continuous experience monitoring engine, according to some embodiments.

In referring to FIG. 1, output from experience execution monitoring center 160 is in-part forwarded to continuous experience monitoring engine 170, which is shown in more detail in FIG. 8. In some embodiments, continuous experience monitoring engine 170 includes a digital experience monitoring module 800, an experience metrics analyzer 810, and a dynamic experience ingestion layer 820. The modules of continuous experience monitoring engine 170 shown in FIG. 8 collectively perform automated monitoring and offset metric tracking of targeted experience-related input metrics used to gauge the performance of the executed recommendations. According to some embodiments, digital experience monitoring 800 is configured to collect digital data from system logs or other system sources capable of collecting and storing digital data in regular intervals. Subsequently, the digital data are converted to experience-related metrics and forwarded to experience metrics analyzer 810 where they are quantified and reported, for example, to experience reporting cockpit 140. According to some embodiments, if additional data are necessary, alternative data sources may be used—such as input from the participants as discussed above. The additional data may be collected via the dynamic experience ingestion engine 820.

As shown in FIG. 8, the modules of continuous experience monitoring engine 170 are configured to communicate with each other and with experience reporting cockpit 140. Further, as shown in FIG. 1, experience reporting cockpit 140, experience enhancement recommendation engine 150, experience execution monitoring center 160, and continuous experience monitoring engine 170 form a closed loop that indicates a continuous monitoring action performed by these modules in experience analyzer tool 100. Consequently, and as the monitoring action progresses, the proposed recommendations are re-evaluated based on the continuous data collection described above. New recommendations may be provided by experience enhancement recommendation engine 150 when the UX metrics or indicators show that UX is moving towards a non-desirable direction. According to some embodiments, the operations of experience analyzer tool 100 may be restarted as indicated by dashed arrow connector 180.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" "(SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system to assess user experience, comprising:
one or more computers and one or more storage devices storing instructions thereon that, when executed by the one or more computers, cause the one or more computers to form one or more functional modules comprising:
an experience journey metadata simulator configured to determine one or more experience journey maps and identify personas who participate in the one or more experience journey maps, wherein each of the one or more journey maps comprises one or more processes performed by the identified personas;
a dynamic experience ingestion layer configured to collect user experience related data from the participating personas, one or more system logs, or combinations thereof, wherein the user experience related data comprise text data, audio data, video data, or combinations thereof collected via corresponding extractor engines operable to collect, parse, and extract user experience related metrics from the collected user experience related data;
an experience analytics engine configured to identify user experience gaps, as perceived by the personas, by processing and classifying with one or more computer-implemented models the user experience related metrics outputted by the extractor engines in the dynamic experience ingestion layer, wherein the user experience gaps correspond to user experience differences between personas acting as customers and personas acting as employees, and wherein the user experience gaps are quantified, measured, and classified in terms of a four dimension matrix;
an experience reporting cockpit configured to (i) provide a graphical representation that highlights the user experience gaps identified by the experience analytics engine and (ii) perform root cause analysis for the identified user experience gaps by defining potential factors for each user experience gap, and subsequently aggregating and accumulating the user experience gaps under the defined factors;
an experience enhancement recommendation engine configured to auto-generate recommendations for execution to mitigate the user experience gaps highlighted in the graphical representation, wherein the auto-generated recommendations include recommendation proposal data categorized based on the root cause analysis performed in the experience reporting cockpit;
an experience execution monitoring center configured to monitor and track a progress of the executed recommendations, detect whether potential corrective actions are required, and provide feedback about the progress and the potential corrective actions to the experience reporting cockpit; and
a continuous experience monitoring engine configured to:

perform automated monitoring and offset metric tracking of targeted experience-related input metrics used to gauge a performance of the executed recommendations; and report the performance of the executed recommendations to the experience reporting cockpit so that new recommendations are autogenerated by the experience enhancement recommendation engine when the performance is moving towards a non-desirable direction.

2. The system of claim 1, wherein the personas are divided to customers with a perceived customer experience and to employees with a perceived employee experience.

3. The system of claim 2, wherein the user experience gaps identified by the experience analytics engine are measured in terms of the customer experience and the employee experience.

4. The system of claim 1, wherein the user experience related data further comprise digital footprint data.

5. The system of claim 1, wherein each of the one or more experience journey maps comprises experience touchpoints at which the personas have the opportunity to interact with the experience journey map.

6. The system of claim 5, wherein the user experience gaps are measured at every experience touchpoint within each experience journey map.

7. The system of claim 1, wherein the four dimension matrix includes a credibility dimension, a responsiveness dimension, a seamlessness dimension, and an engagement dimension.

8. The system of claim 1, wherein the experience analytics engine comprises a self-learning analyzer module that includes one or more machine learning models, one or more natural language processing models, one or more image processing models, or any combinations thereof to analyze the experience related data.

9. A non-transitory computer readable storage medium having computer program code stored thereon, the computer program code, when executed by one or more processors, causes a system that assesses user experience to perform a method comprising:

determining with an experience journey metadata simulator one or more experience journey maps and identifying personas who participate in the one or more experience journey maps, wherein each of the one or more journey maps comprises one or more processes performed by the identified personas;

collecting with a dynamic experience ingestion layer user experience related data from the participating personas, one or more system logs, or combinations thereof, wherein the user experience related data comprise text data, audio data, video data, or combinations thereof collected via corresponding extractor engines operable to collect, parse, and extract user experience related metrics from the collected user experience related data;

identifying an experience analytics engine user experience gaps, as perceived by the personas, by processing and classifying with one or more computer-implemented models the user experience related metrics outputted by the extractor engines in the dynamic experience ingestion layer, wherein the user experience gaps correspond to user experience differences between a first group of personas acting as customers and personas acting as employees, and wherein the user experience gaps are quantified, measured, and classified in terms of a four dimension matrix;

providing with an experience reporting cockpit a graphical representation that highlights the user experience gaps identified and performing root cause analysis for the identified user experience gaps by defining potential factors for each user experience gap, and subsequently aggregating and accumulating the user experience gaps under the defined factors;

generating with an experience enhancement recommendation engine auto-generated recommendations for execution to mitigate the user experience gaps highlighted in the graphical representation, wherein the auto-generated recommendations include recommendation proposal data categorized based on the root cause analysis performed in the experience reporting cockpit;

monitoring and tracking with an experience execution monitoring center a progress of the executed recommendations, detecting whether potential corrective actions are required, and providing feedback about the progress and the potential corrective actions to the experience reporting cockpit; and with a continuous experience monitoring engine performing automated monitoring and offset metric tracking of targeted experience-related input metrics used to gauge a performance of the executed recommendations, and reporting the performance of the executed recommendations to the experience reporting cockpit so that new recommendations are autogenerated by the experience enhancement recommendation engine when the performance is moving towards a non-desirable direction.

10. The method of claim 9, wherein identifying personas comprises assigning participants to each persona with each persona being a role for the assigned participants.

11. The method of claim 9, wherein the personas are divided to customers with a perceived customer experience and to employees with a perceived employee experience.

12. The method of claim 11, wherein the user experience gaps are measured in terms of the customer experience and the employee experience.

13. The method of claim 9, wherein the user experience related data further comprise digital footprint data.

14. The method of claim 9, wherein each of the one or more experience journey maps comprises experience touchpoints at which the personas have the opportunity to interact with the experience journey map and develop their user experience.

15. The system of claim 14, wherein the user experience gaps are measured at every experience touchpoint within each experience journey map.

16. The method of claim 9, wherein the four dimension matrix includes a credibility dimension, a responsiveness dimension, a seamlessness dimension, and an engagement dimension.

17. The method of claim 9, wherein identifying user experience gaps with the experience analytics engine comprises using one or more machine learning models, one or more natural language processing models, one or more image processing models, or any combinations thereof to analyze the experience related data.

18. A computer program product for assessing user experience across experience journeys, the computer program product comprising a non-transitory computer-readable medium having computer readable program code stored thereon, the computer readable program code configured to:

determine with an experience journey metadata simulator one or more experience journey maps and identify personas who participate in the one or more experience journey maps, wherein each of the one or more journey maps comprises one or more processes performed by the identified personas;

collect with a dynamic experience ingestion layer user experience related data from the participating personas, one or more system logs, or combinations thereof, wherein the user experience related data comprise text data, audio data, video data, or combinations thereof collected via corresponding extractor engines operable to collect, parse, and extract user experience related metrics from the collected user experience related data;

identify with an experience analytics engine user experience gaps, as perceived by the personas, by processing and classifying with one or more computer-implemented models the user experience related metrics outputted by the extractor engines in the dynamic experience ingestion layer, wherein the user experience gaps correspond to user experience differences between a first group of personas acting as customers and personas acting as employees, and wherein the user experience gaps are quantified, measured, and classified in terms of a four dimension matrix;

with an experience reporting cockpit (i) provide a graphical representation that highlights the user experience gaps identified and (ii) perform root cause analysis for the identified user experience gaps by defining potential factors for each user experience gap, and subsequently aggregating and accumulating the user experience gaps under the defined factors;

monitor and track with an experience execution monitoring center a progress of the executed recommendations, detect whether potential corrective actions are required, and provide feedback about the progress and the potential corrective actions to the experience reporting cockpit; and perform with a continuous experience monitoring engine automated monitoring and offset metric tracking of targeted experience-related input metrics used to gauge a performance of the executed recommendations, and report the performance of the executed recommendations to the experience reporting cockpit so that new recommendations are autogenerated by the experience enhancement recommendation engine when the performance is moving towards a non-desirable direction.

19. The computer program product of claim 18, wherein the personas are divided to customers with a perceived customer experience and to employees with a perceived employee experience.

20. The computer program product of claim 18, wherein the user experience related data further comprise digital footprint data.

\* \* \* \* \*

UNITED STATES PATENT AND TRADEMARK OFFICE
CERTIFICATE OF CORRECTION

| | | |
|---|---|---|
| PATENT NO. | : 11,741,172 B2 | Page 1 of 1 |
| APPLICATION NO. | : 17/468454 | |
| DATED | : August 29, 2023 | |
| INVENTOR(S) | : Saxena et al. | |

It is certified that error appears in the above-identified patent and that said Letters Patent is hereby corrected as shown below:

In the Claims

In Column 19, Claim number 9, Line number 64, delete "a first group of".

In Column 21, Claim number 18, Line number 22, delete "a first group of".

Signed and Sealed this
Tenth Day of October, 2023

Katherine Kelly Vidal
*Director of the United States Patent and Trademark Office*